(12) United States Patent
Smola et al.

(10) Patent No.: US 10,587,490 B2
(45) Date of Patent: Mar. 10, 2020

(54) EVALUATING RESOURCE PERFORMANCE FROM MISALIGNED CLOUD DATA

(71) Applicant: Red Hat, Inc., Raleigh, NC (US)

(72) Inventors: Ladislav Smola, Brno (CZ); Greg D. Blomquist, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 453 days.

(21) Appl. No.: 15/017,150

(22) Filed: Feb. 5, 2016

(65) Prior Publication Data
US 2017/0230266 A1 Aug. 10, 2017

(51) Int. Cl.
*H04L 12/26* (2006.01)

(52) U.S. Cl.
CPC .............................. *H04L 43/0876* (2013.01)

(58) Field of Classification Search
CPC ............... H04L 43/0876; H04L 43/024; H04L 43/0817; G06F 16/248
See application file for complete search history.

(56) References Cited

U.S. PATENT DOCUMENTS

| | | | |
|---|---|---|---|
| 5,471,631 A | 11/1995 | Beardsley et al. | |
| 7,590,151 B2 | 9/2009 | Middleton et al. | |
| 8,909,661 B2 | 12/2014 | Ojanpera | |
| 2006/0122989 A1* | 6/2006 | Kurupati | ........... G06F 17/30595 |
| 2010/0235836 A1 | 9/2010 | Bratanov | |
| 2011/0258621 A1* | 10/2011 | Kern | ..................... G06F 9/5072 718/1 |
| 2013/0282804 A1 | 10/2013 | Mate et al. | |
| 2014/0215058 A1* | 7/2014 | Vicat-Blanc | .......... H04L 43/045 709/224 |
| 2014/0282089 A1 | 9/2014 | West et al. | |
| 2015/0378861 A1* | 12/2015 | Deshpande | ......... G06F 11/3409 717/131 |
| 2016/0094424 A1* | 3/2016 | Niestemski | ......... H04L 41/0823 709/224 |
| 2017/0180220 A1* | 6/2017 | Leckey | ............... H04L 12/4641 |

OTHER PUBLICATIONS

"Welcome to the Ceilometer developer documentation!—Ceilometer 6.0.0.dev116 documentaiton" Openstack Cloud Software; 2 pages, downloaded on http://docs.openstack.org/developer/ceilometer/ on Nov. 17, 2015.

(Continued)

*Primary Examiner* — Soe Hlaing
(74) *Attorney, Agent, or Firm* — Lowenstein Sandler LLP

(57) ABSTRACT

A processing device sends a request to a cloud provider for data for a metric for a particular resource being provided by the cloud provider, receives one or more data steams for the metric for the particular resource from the cloud provider. The one or more data streams includes data points over a specified period of time. The data points have one or more different time intervals between the data points. The processing device creates a uniform data stream from data in the one or more data streams. The uniform data stream includes data points that have the same time intervals between the data point. The processing device determines the utilization of the particular resource from the uniform data stream.

15 Claims, 6 Drawing Sheets

(56) References Cited

OTHER PUBLICATIONS

"Telemetry—OpenStack", 4 pages, downloaded from https://wiki.openstack.org/w/index.php?title=Telemetry&oldid=97024 on Nov. 17, 2015.
"Partition and scale data in DocumentDB", 2015, 4 pages, GitHub, Inc., downloaded from https://github.com/Azure/azure-content/blob/master/articles/documentdb/documentdb-partition-data.md on Nov. 17, 2015.
Danjou, Julien, "OpenStack Ceilometer and the Gnocchi experiment", 2014, 16 pages, downloaded from https://julien.danjou.info/blog/2014/openstack-ceilometer-the-gnocchi-experiment on Nov. 17, 2015.
"Gnocchi—OpenStack", 5 pages, downloaded from "https://wiki.openstack.org/w/index.php?title=Gnocchi&oldid=81511" on Nov. 17, 2015.
"Chapter 3. Enhancements—Red Hat Customer Portal" 2015, 5 pages, Red Hat, Inc., downloaded from https://access.redhat.com/documentation/en/red-hat-cloudforms/4.0/release-notes/chapter-3-enhancements on Nov. 17, 2015.

* cited by examiner

US 10,587,490 B2

EVALUATING RESOURCE PERFORMANCE FROM MISALIGNED CLOUD DATA

TECHNICAL FIELD

The present disclosure relates to resource performance, and more particularly, to evaluating resource performance from misaligned cloud data.

BACKGROUND

Cloud computing is generally becoming the platform of choice for businesses that want to reduce operating expenses and be able to scale resources rapidly. Eased automation, flexibility, mobility, resiliency, and redundancy are several other advantages of moving resources to the cloud. Some cloud resources may be overloaded and some cloud resources may be underutilized. Clouds can capture resource metrics to help monitor the performance of the cloud resources. Clouds may be provided by different cloud providers and may have different metric parameters and reporting parameters. The evaluation of cloud resource performance across different cloud platforms is generally difficult due to the different metric parameters and reporting parameters. Conventional efforts in comparing resource performance amongst different cloud platforms are typically limited because data from the various clouds are generally misaligned and not comparable with each other.

BRIEF DESCRIPTION OF THE DRAWINGS

The present disclosure will be understood more fully from the detailed description given below and from the accompanying drawings of various implementations of the disclosure.

DETAILED DESCRIPTION

Implementations of the present disclosure describe evaluating resource performance from misaligned cloud data. Different cloud providers can provide resources via a respective cloud, and may operate cloud platforms that are different from each other. The resources can be virtual resources, such as, virtual machines (VMs) and containers, and non-virtual resources, such as a bare metal system. A bare metal system is represented by a computing operating system running on physical hardware without a virtualization layer. The various cloud platforms may have different metric parameters and reporting parameters for monitoring the performances of the cloud resources. The metric parameters and reporting parameters within the same cloud platform for monitoring the performances of the cloud resources may be misaligned. Some cloud resources may be overloaded and some cloud resources may be underutilized. Conventional efforts in comparing resource performance amongst different cloud platforms and/or misaligned data within the same cloud platform are typically limited because data is generally not comparable with each other.

Implementations of the present disclosure collect performance data for various virtual and non-virtual cloud resources that are being provided by one or more cloud providers, normalize the performance data to create a data structure of uniform performance data, and evaluate the performance of the individual resources based on the uniform performance data. Implementations of the present disclosure can determine whether the resources are overloaded or underutilized. Implementations of the present disclosure can reconfigure the cloud resources across the different cloud platforms and/or within the same cloud platform based on whether individual resources are overloaded or underutilized.

Figure 1:
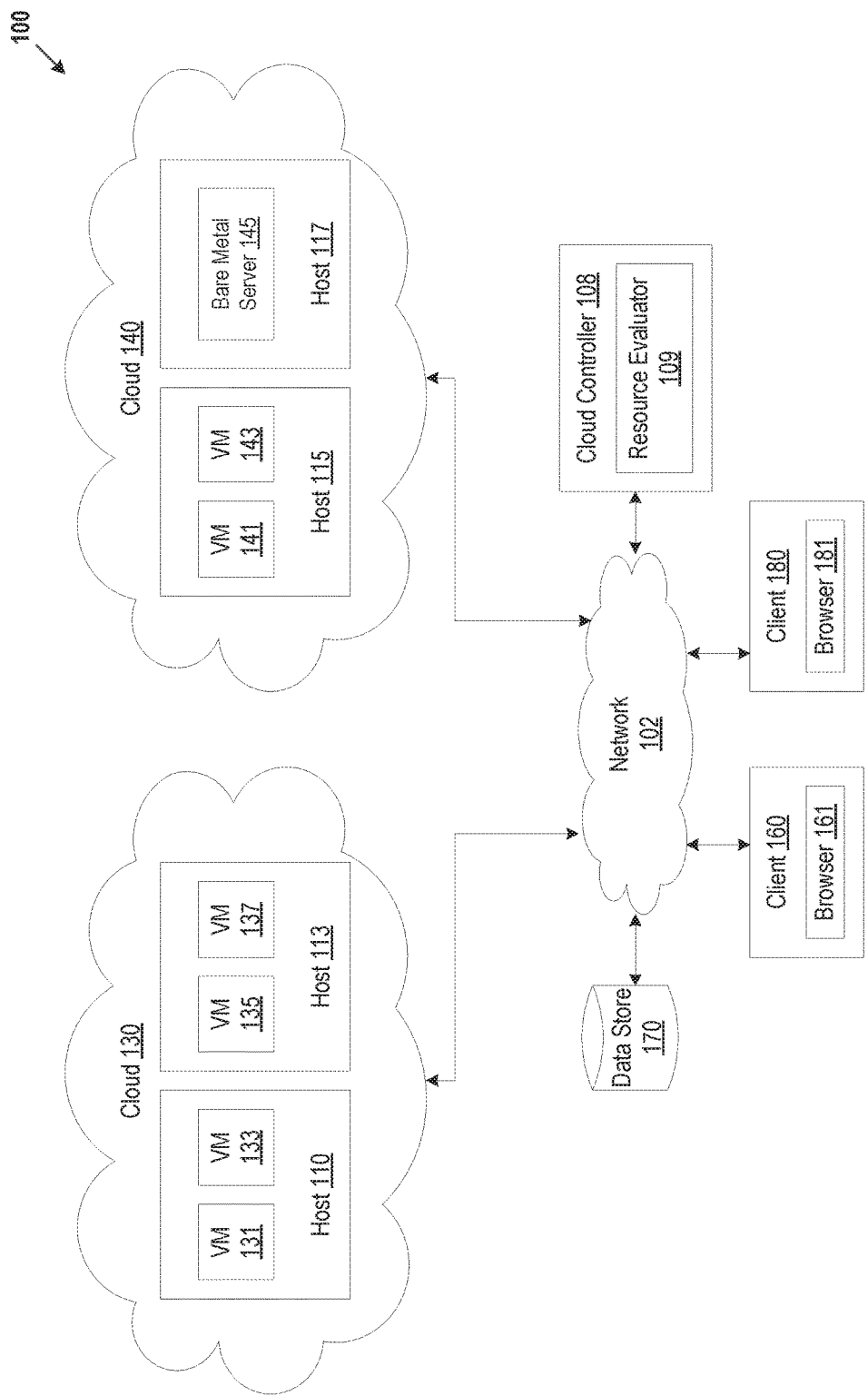
FIG. 1 is an example system architecture in which implementations of the present disclosure can be implemented.

FIG. 1 is an example system architecture 100 in which implementations of the present disclosure can be implemented. The system architecture 100 can include one cloud or multiple clouds. There can be a large number of clouds. For brevity and simplicity, two clouds 130,140 are used as an example throughout this document. The clouds 130,140 can provide resources (e.g., computing, storage, and networking resources) to entities. An entity, as referred to herein, can represent any software provider, service provider, a business organization such as a corporation, an educational institution such as a college and university, etc. For example, several entities may be different Enterprise companies and may store and access different data sets in the clouds 130,140. In another example, several sub-entities may be different departments within the same entity, such as an Enterprise company, and may store and access data in one or more of the clouds 130,140.

Computing resources can include processing devices, host machines, software containers, bare metal systems, virtual machines, applications, memory, hypervisors, etc. Storage resources can include, and are not limited to, storage servers, storage software, disks, data stores, etc. Networking resources can include, and are not limited to, network interface cards, ports, routers, switches, internet protocol addresses, network domains, etc.

The resources can be provided by physical machines (e.g., hosts 110,113,115,117), which can be located in one or more data centers for a respective cloud 130,140. The clouds 130,140 may be provided by, for example, by the same or different cloud providers. For example, cloud 130 may be provided by Cloud-Provider-A, and cloud 140 may be provided by Cloud-Provider-B. A cloud provider can provide more than one cloud 130,140. The resources can be virtual resources, such as, VMs and containers, and non-virtual resources, such as a bare metal system. A bare metal system (e.g., bare metal server 145) is represented by a computing operating system running on physical hardware (e.g., host 117) without a virtualization layer.

The cloud providers may operate cloud platforms that are different from each other, and some platforms may or may not support provision of both virtual and non-virtual resources. For example, the cloud platform of Cloud-Provider-B may be capable to deploy both virtual resources (e.g., VM 141 and VM 143 in host 115) and non-virtual resources, such as a bare metal system (e.g., bare metal server 145 in host 117) in cloud 140. Cloud-Provider-A may be capable only to deploy virtual resources, such as VM 131 and VM 133 in host 110, and VM 135 and VM 137 in host 113.

There can be a large number of virtual machines, containers, and/or containers within virtual machines in a cloud 130,140. For brevity and simplicity, four virtual machines in cloud 130, and two virtual machines in cloud 140 are used as an example in system architecture 100. Each virtual machine is hosted on a physical machine configured as part of the cloud 130,140, such as hosts 110,113,115. There can be a large number of bare metal servers (e.g., bare metal server 145) in a cloud 140. For brevity and simplicity, one bare metal server 145 in cloud 140 is used as an example in system architecture 100. Each bare metal server is hosted on a physical machine configured as part of the cloud (e.g., cloud 140), such as host 117.

Users can interact with applications executing on cloud resources using client computer systems, such as clients 160,180, via corresponding applications (e.g., web browser programs 161,181). There can be a large number of clients. For brevity and simplicity, two clients 160,180 are used as an example in architecture 100.

Clients 160,180 can be connected to the one or more hosts 110,113,115,117 via a network 102. Each client 160,180 can be a mobile device, a PDA, a laptop, a desktop computer, or any other computing device. Each host 110,113,115,117 may be a server computer system, a desktop computer or any other computing device.

In one implementation, the clouds 130,140 are coupled to a cloud controller 108 via the network 102, which may be a private network (e.g., a local area network (LAN), a wide area network (WAN), intranet, or other similar private networks) or a public network (e.g., the Internet). The cloud controller 108 can reside on a machine (e.g., server computer, desktop computer, etc.). The cloud controller 108 may be maintained by a cloud consumer of the clouds 130,140, such as an Enterprise (e.g., business, company). In another implementation, the cloud controller 108 may be maintained by a cloud provider (e.g., Cloud-Provider-A providing cloud 130, Cloud-Provider-B providing cloud 140).

The cloud controller 108 can manage the deployment of resources (e.g., bare metal systems, virtual machines, containers, containers within VMs, etc.) in the respective clouds 130,140. The cloud controller 108 can receive input, for example, from a system administrator via a client 160,180, requesting that a VM (e.g., VM 131) to be deployed in cloud 130 and/or a bare metal system (e.g., bare metal server 145) to be deployed in a different cloud (e.g., cloud 140). A request can be for a large number of resources, and the cloud controller 108 can receive a large number of requests.

The cloud controller 108 can include a resource evaluator 109 to evaluate the performance of the resources (e.g., VMs, bare metal servers, containers, etc.) in the clouds 130,140. The resource evaluator 109 can collect performance data for one or more metrics for the resources in the clouds 130,140. The metrics can be for example, central processing unit (CPU) data, memory data, hard drive or disk data, and network data. The resource evaluator 109 can request performance data from the clouds 130,140 on a per request basis, based on a schedule, at a particular time, etc. The request can be for metric performance data for a period of time (e.g., last hour). The period of time can be specified in configuration data that is stored in a data store 170. The period of time can be configurable and/or user-defined.

For example, the resource evaluator 109 may send a request every hour to cloud 130 of Cloud-Provider-A for CPU information for the last hour for VM 131 running in cloud 130. In another example, the resource evaluator 109 may send a request every hour to cloud 140 of Cloud-Provider-B for hard drive information for the last hour for bare metal server 145 running in cloud 140.

In response to a request, the resource evaluator 109 can receive one or more data streams for a metric (e.g., CPU information, hard drive information) for a particular resource (e.g., VM 131, bare metal server 145) from a respective cloud 130,140. The data streams can have different measurement parameters. The measurement parameters can include, for example, the time intervals between data points in a data stream, the frequency of data points in a data stream, etc.

The resource evaluator 109 can normalize the data from multiple data sources (e.g., resources in cloud 130, resources cloud 140) according to one or more specified measurement parameters (e.g., time interval, data point frequency) to create uniform data streams. The measurement parameters can be specified in configuration data that is stored in a data store (e.g., data store 170). The specified measurement parameters can be configurable and user-defined. For example, the uniform data streams can have the same time intervals (e.g., 20 seconds) between data points and/or the same number of data points over the same period of time. Normalizing the data from multiple data sources is described in greater detail below in conjunction with FIG. 2 to FIG. 4.

The resource evaluator 109 can create a data structure that stores the data for the uniform data streams. For example, the data structure can be a key-value database that uses the time-stamps for the data points in the uniform data streams as keys. The data structure can be stored in one or more data stores (e.g., data store 170). A data store 170 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

The resource evaluator 109 can use the uniform data stream(s) of a resource to determine the performance (e.g., utilization) of the resource in a cloud (e.g., cloud 130) relative to one or more thresholds, relative to other resources within the same cloud (e.g., cloud 130), and/or relative to other resources in other different clouds (e.g., cloud 140). The resource evaluator 109 can compare various metrics (e.g., CPU utilization, memory utilization, disk utilization, hard drive utilization, network utilization) of a particular resource to other metrics of the resource, which may have different metric measurement parameters, by using the uniform data streams.

The resource evaluator 109 can cause one or more actions to be performed on a resource based on the utilization of the resource. For example, the resource evaluator 109 can send a notification to a user and/or system indicating whether a resource is under-utilized or over-utilized. In another example, the resource evaluator 109 can cause the workload of one or more resource to be rebalanced.

In one implementation, the resource evaluator 109 can collect performance data for various metrics for multiple resources being provided by multiple cloud providers. The cloud providers can be different cloud providers. The performance data from the multiple cloud providers can have misaligned time scales, and the resource evaluator 109 can create corresponding uniform data streams for the various metrics from the performance data. The uniform data streams can include data points that are aligned on the same time scale. The resource evaluator 109 can determine the utilization of the resources from the uniform data streams. For example, the resource evaluator 109 can determine whether a resource is under-utilized or over-utilized. The resource evaluator 109 can cause one or more actions to be performed on one or more of the resources as specified by a policy in view of utilization of the resources. The actions can include, for example, moving at least a portion of a workload of a resource to another resource. For example, the resource evaluator 109 can cause the cloud controller 108 to move at least a portion of the workload of a resource to another resource.

Figure 2:
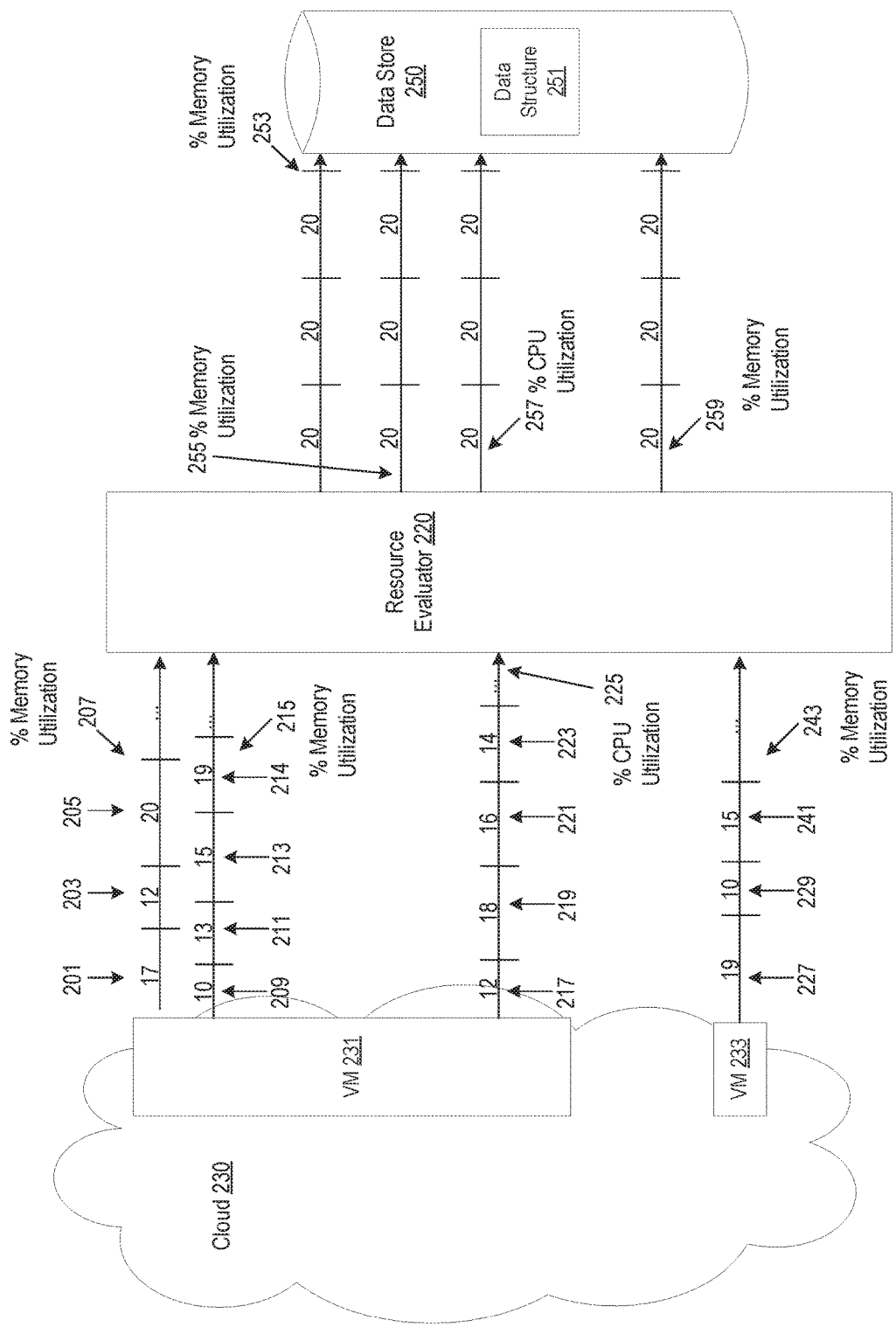
FIG. 2 illustrates examples of creating uniform data streams from various data streams having different measurement parameters, in accordance with one or more implementations of the present disclosure.

FIG. 2 illustrates examples of creating uniform data streams from various data streams having different measurement parameters, in accordance with one or more implementations of the present disclosure. The resource evaluator 220 can receive data streams that include metric data for a resource. Data for virtual machines (e.g., VM 231, VM 233) for some metrics, such as memory utilization and CPU utilization, can be measured using respective single data streams. For example, the resource evaluator 220 may receive a data stream 207 from Cloud-Provider-A for percentage (%) memory utilization information for the last hour for VM 231 running in cloud 230. Data for virtual machines and bare metal systems, for some metrics, can be measured using multiple data streams, as described in greater detail below in conjunction with FIG. 3.

Referring to FIG. 2, the data streams can be for different periods of time (e.g., different hours). For example, the resource evaluator 220 may receive a data stream 215 from Cloud-Provider-A for percentage (%) memory utilization information for an hour for VM 231 that is different from the hour of data in data stream 207.

The data streams can be for different metrics. For example, data stream 207 and data stream 215 can include data for percentage memory utilization. The resource evaluator 220 may also receive a data stream 225 from Cloud-Provider-A for percentage (%) CPU utilization information for the last hour for VM 231 running in cloud 230.

The data streams can be for different resources. For example, data stream 207, data stream 215, and data stream 225 can include data for VM 231. The resource evaluator 220 may also receive a data stream 243 from Cloud-Provider-A for percentage (%) memory utilization information for the last hour for a different virtual machine, VM 233, running in cloud 230.

One or more data streams can include random time intervals between data points. The random time intervals can have corresponding random time-stamps for each data point. The time intervals can be random relative to other time intervals within a data stream and/or relative to other time intervals in other data streams. For example, there can be different time intervals between the data points within the data stream 207. As illustrated in data stream 207, there is a 17 second time interval 201, followed by a 12 second time interval 203, followed by a 20 second time interval 205, etc.

There can be different time intervals between the data points amongst different data streams for the same metric (e.g., memory utilization) for the same resource (e.g., VM 231). For example, data stream 207 and data stream 215 can both contain data for percentage memory utilization for the same VM (e.g., VM 231). As illustrated in data stream 207, there is a 17 second time interval 201, followed by a 12 second time interval 203, followed by a 20 second time interval 205, etc. As illustrated in data stream 215, there is a 10 second time interval 209, followed by a 13 second time interval 211, followed by a 15 second time interval 213, followed by a 19 second time interval 214, etc. The time intervals in data stream 215 are different from the time intervals in data stream 207.

There can be different time intervals between the data points amongst different data streams for the same metric (e.g., memory utilization) for different resources (e.g., VM 231 and VM 233). For example, data stream 207 and data stream 243 can both contain data for percentage memory utilization. Data stream 207 can be for VM 231, and data stream 243 can be for VM 233. As illustrated in data stream 207, there is a 17 second time interval 201, followed by a 12 second time interval 203, followed by a 20 second time interval 205, etc. As illustrated in data stream 243, there is a 19 second time interval 227, followed by a 10 second time interval 229, followed by a 15 second time interval 241, etc. The time intervals in data stream 243 are different from the time intervals in data stream 207.

There can be different time intervals between different data streams for different metrics for the same resource (e.g., VM 231). For example, data stream 207 and data stream 225 can both contain data for VM 231. Data stream 207 can be for % memory utilization for VM 231, and data stream 225 can be for % CPU utilization for VM 231. As illustrated in data stream 207, there is a 17 second time interval 201, followed by a 12 second time interval 203, followed by a 20 second time interval 205, etc. As illustrated in data stream 225 there is a 12 second time interval 217, followed by a 18 second time interval 219, followed by a 16 second time interval 221, followed by a 14 second time interval 223, etc. The time intervals in data stream 225 are different from the time intervals in data stream 207.

The resource evaluator 220 can create a data structure 251 to store the performance data for the resources of the one or more clouds. The data structure 251 can use time-stamps as entry identifiers for the data. For example, the data structure 251 can be a key-value based structure and can use time-stamps as keys. A key can correspond to one or more values. For example, the data structure 251 can include an entry for Time-stamp-1238, which can have a corresponding memory utilization value, a corresponding CPU utilization value, a corresponding disk utilization value, and a corresponding network utilization value. In one example, a key (e.g., time-stamp) in the data structure 251 can have corresponding values for a particular resource (e.g., VM 231). For example, the values for Time-stamp-1238 may be memory utilization value for VM 231, CPU utilization value for VM 231, disk utilization value for VM 231, and/or network utilization value for VM 231. In another example, a key (e.g., time-stamp) in the data structure 251 can have corresponding values for more than one resource (e.g., VM 231 and VM 233). For example, the values for Time-stamp-1238 may be memory utilization values for VM 231 and VM 233, CPU utilization values for VM 231 and VM 233, disk utilization values for VM 231 and VM 233, and/or network utilization values for VM 231 and VM 233.

The data streams (e.g., data streams 207,215,225,243) that include random time-stamps cannot be input into the data structure 251 because the random time stamps may produce inaccurate and/or unreliable data entries. For example, the key (e.g., Time-stamp-0010), which represents the time-stamp at 10 seconds, may have a corresponding data point from data stream 215, but may not have a corresponding data point from data stream 207 or data stream 225.

The resource evaluator 220 can normalize the random time stamps in the data streams (e.g., data stream 207,215, 225,243) to create uniform data streams (e.g., data streams 253,255,257,259) that have the same time intervals and/or number of data points over a period of time. For example, the resource evaluator 220 can use the data in data stream 207 to create data stream 253, which is a corresponding uniform data stream for data stream 207. In another example, the resource evaluator 220 can use the data in data stream 215 to create data stream 255, which is a corresponding uniform data stream for data stream 215. In another example, the resource evaluator 220 can use the data in data stream 225 to create data stream 257, which is a corresponding uniform data stream for data stream 225. In another example, the resource evaluator 220 can use the data in data stream 243 to create data stream 259, which is a corresponding uniform data stream for data stream 243. The uniform data streams 253,255,257,259 can each have a twenty second time interval between data points and can be aligned on the same time-scale (e.g., twenty second interval time-scale) to conform to the format of each other.

The data in the uniform data streams (e.g., data streams 253,255,257,259), which includes the same time intervals (e.g., 20 seconds) and aligned time intervals, can be used as input into the data structure 251 to produce accurate and reliable data entries. For example, the key (e.g., Time-stamp-0040), which represents the time-stamp at 40 seconds, may have a corresponding data point for memory utilization from data stream 253, a corresponding data point for memory utilization from data stream 255, a corresponding data point for CPU utilization from data stream 257, and/or a corresponding data point for memory utilization from data stream 259.

Figure 3:
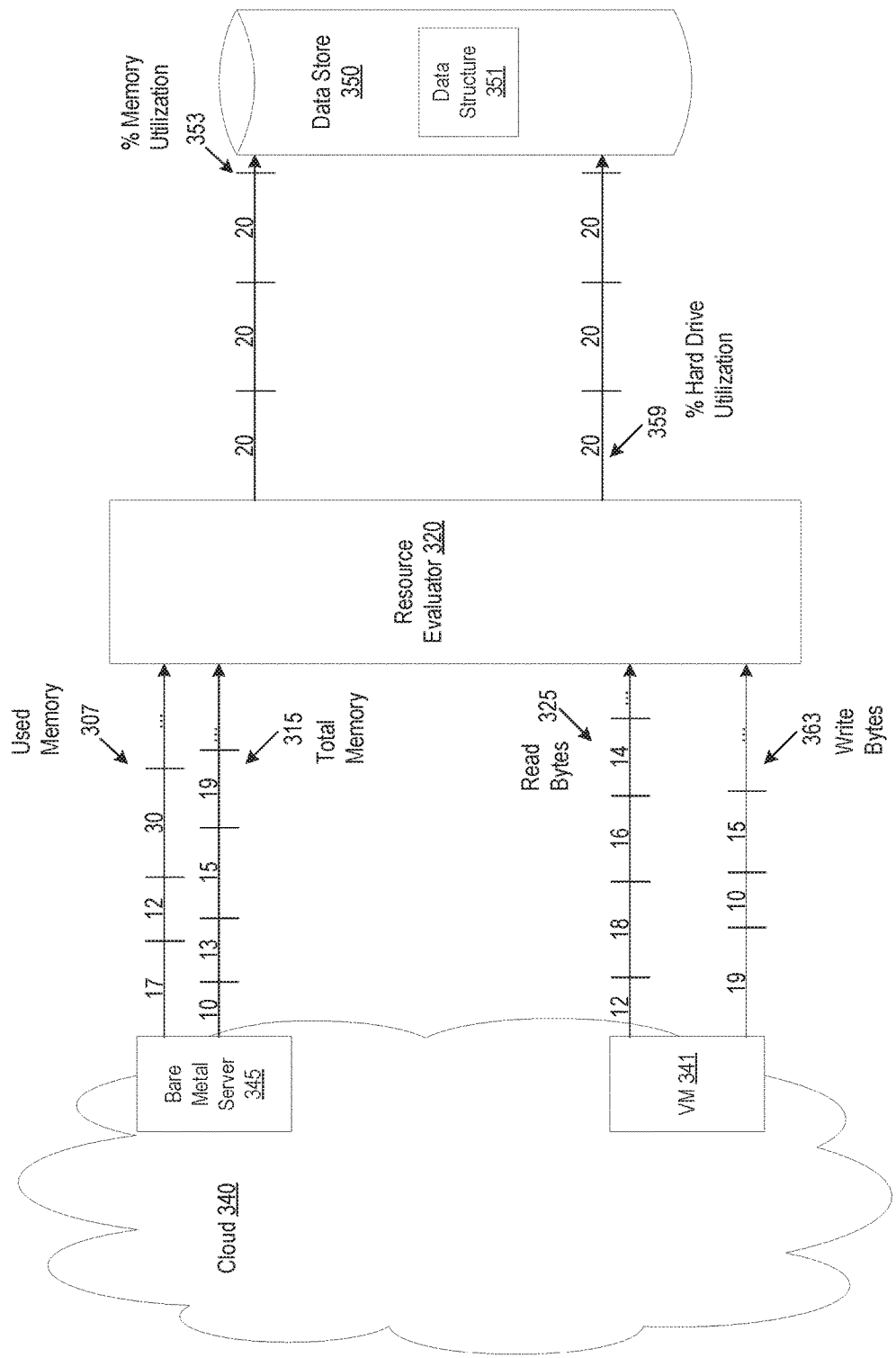
FIG. 3 illustrates examples of creating uniform data streams from various data streams having different measurement parameters, in accordance with one or more implementations of the present disclosure.

FIG. 3 illustrates examples of creating uniform data streams from various data streams having different measurement parameters, in accordance with one or more implementations of the present disclosure. Data for a metric (e.g., memory utilization, CPU utilization, hard drive utilization, hard disk utilization, network utilization) can be measured using multiple data streams. For example, the resource evaluator 320 may receive a pair of data streams (e.g., data stream 307 and data stream 315) from Cloud-Provider-B for memory information for the last hour for bare metal server 345 running in cloud 340. Data stream 307 can include data points for the amount of used memory for the last hour for bare metal server 345, and data stream 315 can include data points for the amount of total memory for the last hour for bare metal server 345.

In another example, the resource evaluator 320 may receive a pair of data streams (e.g., data stream 325 and data stream 363) from Cloud-Provider-B for virtual hard drive information for the last hour for VM 341 running in cloud 340. Data stream 325 can include data points for the amount of bytes read for the last hour for VM 341, and data stream 363 can include data points for the amount of bytes written to for the last hour for VM 341.

The individual data streams (e.g., data streams 307,315, 325,363) for a respective metric (e.g., memory, hard drive) can include random time intervals between data points. The time intervals can be random relative to other time intervals within a data stream and/or relative to other time intervals in other data streams.

The resource evaluator 320 can normalize the random time stamps in the data streams (e.g., data stream 307,315, 325,363) to create corresponding uniform data streams (e.g., data streams 353,351) that have the same time intervals and/or number of data points over a period of time. Normalizing multiple data streams for a metric is described in greater detail below in conjunction with FIG. 5. Referring to FIG. 3, for example, the resource evaluator 320 can use the used memory data in data stream 307 and the total memory data stream 315 to create data stream 353, which includes data points representing the percentage memory utilization for bare metal server 345. In another example, the resource evaluator 320 can use the bytes read data in data stream 325 and the bytes written to data in data stream 363 to create data stream 359, which includes data points representing the percentage hard drive utilization for the virtual hard drive in VM 341, as described in greater detail below in conjunction with FIG. 5. The uniform data streams 353,359 can each have a twenty second time interval between data points and can be aligned on the same time-scale (e.g., twenty second interval time-scale) to conform to the format of each other.

The data in the uniform data streams (e.g., data streams 353,359), which includes the same time intervals (e.g., 20 seconds) and aligned time intervals, can be input into the data structure 351 to produce accurate and reliable data entries. For example, the key (e.g., Time-stamp-0060), which represents the time-stamp at 60 seconds, may have a corresponding data point for percentage memory utilization from uniform data stream 353 and/or a corresponding data point for virtual hard drive utilization from uniform data stream 359.

Figure 4:
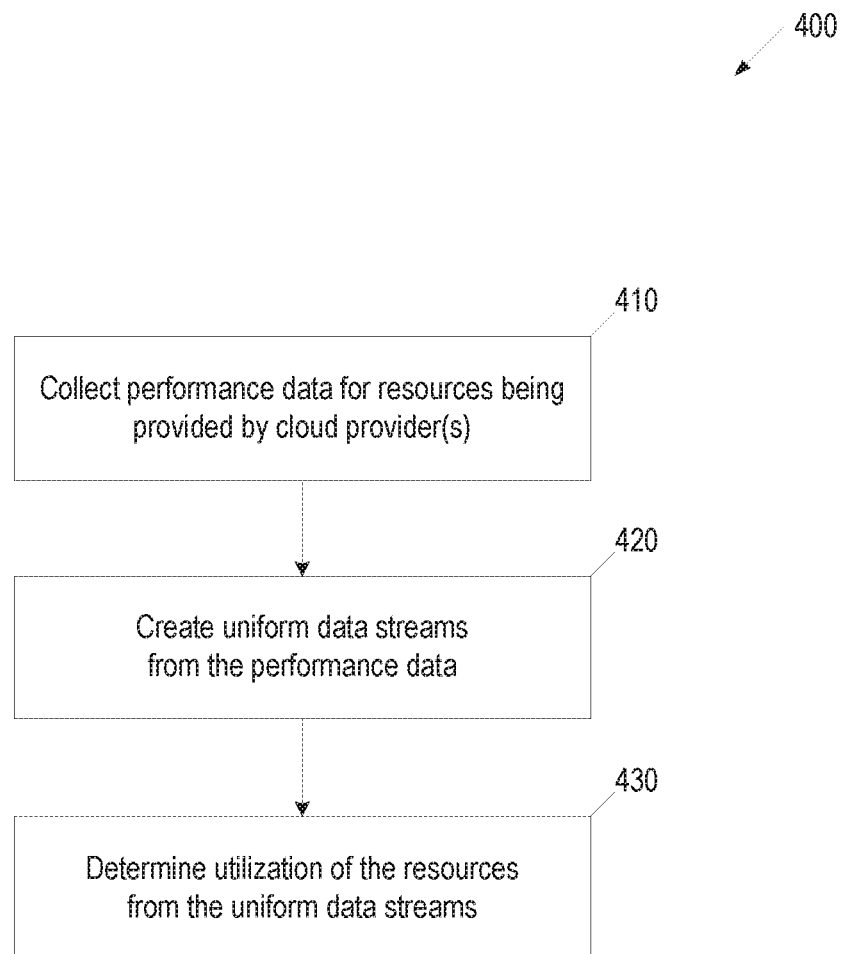
FIG. 4 is a flow diagram for a method for evaluating resource performance from misaligned cloud data, in accordance with one or more implementations of the present disclosure.

FIG. 4 is a flow diagram for a method 400 for evaluating resource performance from misaligned cloud data, in accordance with one or more implementations of the present disclosure. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a resource evaluator (e.g., resource evaluator 109 of FIG. 1, resource evaluator 220 of FIG. 2, resource evaluator 320 of FIG. 3) executed by a processing device in a computing machine. At least a portion of method 400 can be performed automatically by the computing machine without user interaction.

At block 410, the processing device collects performance data for resources being provided by one or more cloud providers. Examples of resources can include, and are not limited to, a bare metal server, a component of a bare metal server, a virtual machine, a container, and a container within a virtual machine. The performance data can include data for memory utilization, central processing unit utilization, hard drive utilization, disk utilization, and/or network utilization. The performance data from the cloud providers can have misaligned time scales. For example, the performance data can include data streams having data points over a specified period of time, and the data points can have one or more different time intervals between the data points. The performance data is described in greater detail below in conjunction with FIG. 5.

At block 420, the processing device creates uniform data streams from the performance data. The uniform data streams can include data points that are aligned on the same time scale. The creation of the uniform data streams is described in greater detail below in conjunction with FIG. 5. At block 430, the processing device determines utilization of the resources from the uniform data streams. For example, the processing device can determine whether individual resources are being under-utilized or over-utilized.

Figure 5:
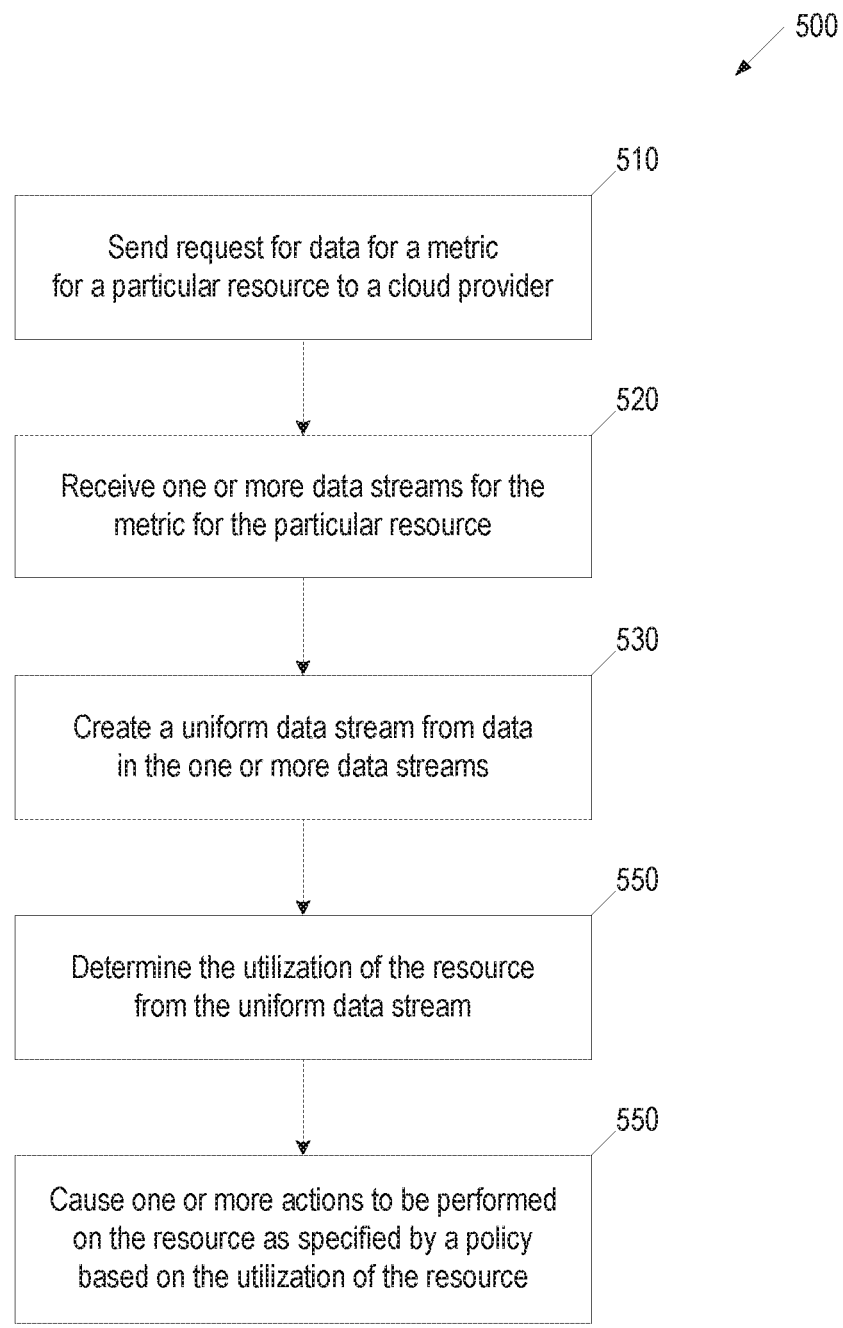
FIG. 5 is a flow diagram for a method for evaluating resource performance from misaligned cloud data, in accordance with one or more implementations of the present disclosure.

FIG. 5 is a flow diagram for a method 500 for evaluating resource performance from misaligned cloud data, in accordance with one or more implementations of the present disclosure. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a resource evaluator (e.g., resource evaluator 109 of FIG. 1, resource evaluator 220 of FIG. 2, resource evaluator 320 of FIG. 3) executed by a processing device in a computing machine. At least a portion of method 500 can be performed automatically by the computing machine without user interaction.

At block 510, the processing device sends a request for data for a metric for a particular resource to a cloud provider. The resource can be a virtual resource (e.g., a VM, a container, a container within a virtual machine) or a non-virtual resource, such as physical resource (e.g., a bare metal resource, a component of a bare metal resource). The request can specify a time period (e.g., last hour) for the requested data. Examples of the metric can include and are not limited to, CPU information (e.g., percentage CPU utilization), memory information (e.g., percentage memory utilization, used memory, total memory), hard drive information (e.g., bytes read, bytes written to), disk information (e.g., bytes read, bytes written to), network information (e.g., bytes transmitted, bytes received), etc. For example, the request may be for CPU information over the last one hour for particular resource (e.g., Virtual-Machine-A, Bare-Metal-Server-B). In one implementation, the processing device sends a request for data for more than one metric for a particular resource to a cloud provider. In one implementation, the processing device sends multiple requests for data for one or more metrics for multiple resources to one or more cloud providers.

At block 520, the processing device receives one or more data streams for the metric(s) for the particular resource(s). The data streams can be received from one or more cloud providers. The one or more data streams can include data points over a specified period of time. The data points can have one or more different time intervals between the data points.

For individual virtual resources (e.g., virtual machines, containers), the processing device can receive a single data stream for certain metrics, such as memory utilization and CPU utilization. For example, the processing device may receive a single data stream for percentage memory utilization for Virtual-Machine-A. In one example, memory utilization can represent the percentage amount of memory bytes used. In one example, CPU utilization can represent the percentage of CPU time during which I/O (input/output) requests were issued to the CPU.

For individual virtual resources, the processing device can receive multiple data streams for certain metrics, such as virtual hard drive utilization, virtual disk utilization, and network utilization. In one example, virtual hard drive utilization and/or virtual disk utilization can represent the amount of bytes read as compared to the amount of bytes written to. In another example, virtual hard drive utilization and/or virtual disk utilization can represent the IOPS (input/output operations per second). In one example, network utilization can represent the percentage of a network's bandwidth that is currently being consumed by network traffic based on the amount of bytes that are being transmitted or received via a network. For example, the processing device may receive a data stream for the amount of bytes transmitted over the network for Virtual-Machine-A, and another data stream for the amount of bytes received over the network for Virtual-Machine-A.

For individual non-virtual resources (e.g., bare metal systems), the processing device can receive multiple data streams for certain metrics, such memory, CPU, hard drive, disk, and network. For example, the processing device may receive a data stream for the amount of bytes transmitted over the network for Bare-Metal-Server-B, and another data stream for the amount of bytes received over the network for Bare-Metal-Server-B. In another example, the processing device may receive a data stream for the amount of bytes read by a hard drive of Bare-Metal-Server-B, and another data stream for the amount of bytes written to by the hard drive of for Bare-Metal-Server-B.

A data stream can include multiple data points, and a data value and a time stamp for each data point over the requested period of time (e.g., last hour). The time interval between the data points in the one or more data streams can be different.

At block 530, the processing device creates a uniform data stream for a metric for a resource from data in the one or more data streams for the metric for the resource. The uniform data stream can include data points that have the same time intervals between the data points. For a single data stream that has random time-stamps, the processing device can normalize the data in the data stream to create a uniform data stream that has the same time intervals (e.g., 20 seconds) between the data points. In one example, to create the uniform data stream, the processing device can determine a sum of the values of the data points in the received data stream, determine the average value over the number of data points in the received data stream, determine the average value over a pre-defined time interval (e.g., 20 seconds), and distribute the average value over the same pre-defined time interval (e.g., 20 seconds). For example, the processing device may determine, from the received data stream, the sum of the values for the data points at the time-stamps corresponding to the 15 second interval, 17 second interval, 23 second interval and 19 second interval. The processing device can then use the sum to determine the average value for a 20 second interval, and distribute the average value over 20 second intervals to create the uniform data stream for the metric for the resource.

For a metric that is measured with multiple data streams that has random misaligned time-stamps, the processing device aligns the received data streams to each other. For example, the processing device can align the time-stamps of the received data stream for read bytes (e.g., read bytes data stream 325 in FIG. 3) to the time-stamps of the received data stream for write bytes (e.g., write bytes data stream 363 in FIG. 3). For example, the processing device may determine the sum of the values for the data points at the time-stamps for the received read data stream 325, determine the average value for a 20 second interval using the sum calculated from the received read data stream 325, and distribute the average value over 20 second intervals to create a uniform data stream for the received read data stream 325. The processing device may determine the sum of the values for the data points at the time-stamps for the received write data stream 363, determine the average value for a 20 second interval using the sum calculated from the received write data stream 363, and distribute the average value over 20 second intervals to create a uniform data stream for the received write data stream. The processing device can calculate a percentage of read bytes to write bytes for each time-stamp corresponding to the 20 second intervals as a percentage hard drive utilization metric using the uniform data stream for the read bytes and the uniform data stream of the write bytes to create a percentage hard drive utilization uniform data stream (e.g., uniform data stream 359 in FIG. 3).

The processing device can detect that a data stream is missing one or more data points, for example, due to the resource being unavailable, due to the time the data for the resource is being received, etc. For example, the processing device may expect to receive 13 data points in a data stream for the last hour for the percentage memory utilization of a virtual machine, but may actually receive 12 data points in the data stream. The processing device can interpolate data for one or more missing data points.

At block 540, the processing device determines the utilization of the particular resource from the uniform data stream. The processing device can determine whether the resource is under-utilized, performing normal utilization, or over-utilized. The processing device can compare the utilization of the resource to one or more thresholds that are specified in configuration data to determine whether the resource is under-utilized, performing at normal utilization, or over-utilized.

In one implementation, at block 550, the processing device causes one or more actions to be performed on the particular resource as specified by a policy in view of the utilization of the particular resource. Actions can include, for example, moving at least a portion of the workload of a resource, sending a notification to a user and/or system, etc. At least a portion of the workload of a resource can be moved to another resource within the same host, to another resource within the same cloud, to another resource in a different host, and/or to another resource in a different cloud. For example, the processing device may determine, from various data streams, the utilization of a particular metric for a particular container is at 80% utilization, and the utilization of a particular metric of the VM that is hosting the container is at 90% utilization, and the processing device may cause the container to be moved to another virtual machine to improve the throughput or the container and/or the virtual machine.

Figure 6:
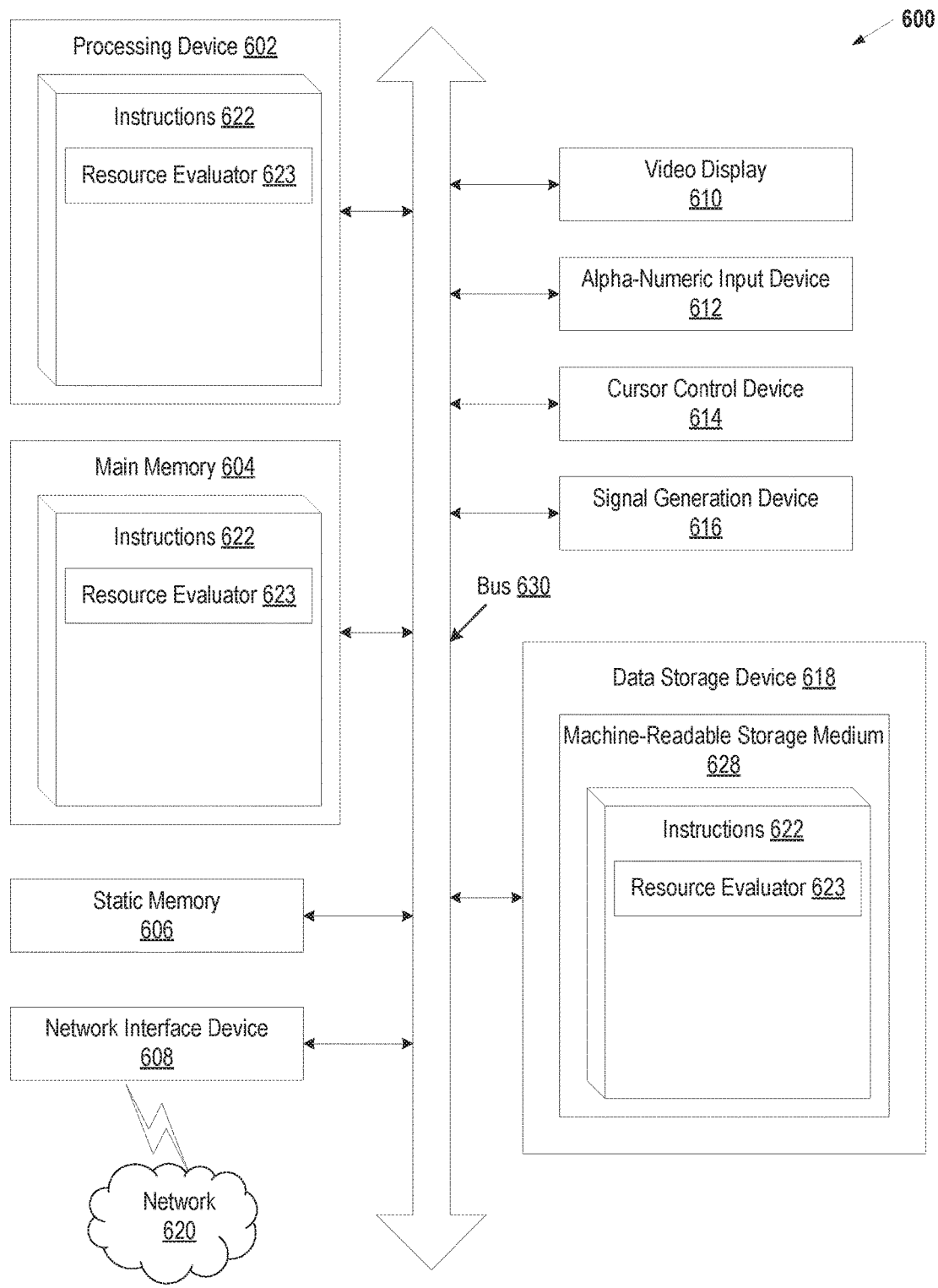
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data store device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT), an alphanumeric input device 612 (e.g., a keyboard), a cursor control device 614 (e.g., a mouse), and a signal generation device 616 (e.g., speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 804 and the processing device 602 also constituting machine-readable storage media.

In one implementation, the instructions 622 include instructions for a resource evaluator 623 (e.g., resource evaluator 109 of FIG. 1, resource evaluator 220 of FIG. 2, resource evaluator 320 of FIG. 3), and/or a software library containing methods that call the resource evaluator 623. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "sending" or "receiving" or "creating" or "determining" or "interpolating" or "moving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
sending a request to a cloud provider, the request for data for a metric of a particular resource provided by the cloud provider;
receiving one or more data streams for the metric for the particular resource from the cloud provider, the one or more data streams comprising data points over a specified period of time, the data points having different time intervals between the data points;
creating a uniform data stream from data in the one or more data streams, the uniform data stream comprising normalized data points having same time intervals between the normalized data points, wherein creating the uniform data stream comprises:
determining at least one data point is missing from the one or more data streams; and
interpolating data in the one or more data streams for the at least one missing data point;
creating a data structure to store data for the uniform data stream, the data structure comprising a key-value database that uses time-stamps to represent the normalized data points in the uniform data stream as keys;
comparing the uniform data stream for the metric to one or more other data streams for other metrics having the same time intervals between data points;
determining, in view of comparing the uniform data stream to the one or more other data streams, utilization of the particular resource; and
causing, in view of the determined utilization of the particular resource, one or more actions to be performed on the particular resource as specified by a policy.

2. The method of claim 1, wherein the particular resource is a bare metal server, a component of a bare metal server, a virtual machine, a container, or a container within a virtual machine.

3. The method of claim 1, wherein the metric comprises at least one of memory utilization, central processing unit utilization, hard drive utilization, disk utilization, or network utilization.

4. The method of claim 1, wherein the one or more actions comprises moving at least a portion of a workload of the particular resource to another resource.

5. The method of claim 1, wherein determining the utilization of the particular resource comprises determining whether the particular resource is being under-utilized or over-utilized.

6. A non-transitory computer-readable storage medium including instructions that, when executed by a processing device, cause the processing device to:
collect performance data for a plurality of resources being provided by a plurality of cloud providers, the performance data from the plurality of cloud providers having misaligned time scales;
create a plurality of uniform data streams from the performance data, the plurality of uniform data streams comprising normalized data points aligned on a same time scale, wherein creating the plurality of uniform data streams comprises:
determining at least one data point is missing from one or more data streams of the performance data; and
interpolating data in the one or more data streams for the at least one missing data point;
create at least one data structure to store data for the plurality of uniform data streams, the at least one data structure comprising a key-value database that uses time-stamps to represent the normalized data points in the uniform data streams as keys;
compare the plurality of uniform data streams to one or more other data streams comprising data points aligned on the same time scale;

determine, in view of comparing the plurality of uniform data streams to the one or more other data streams, utilization of the plurality of resources; and causing, in view of the determined utilization of the plurality of resources, one or more actions to be performed on the plurality of resources as specified by a policy.

7. The non-transitory computer-readable storage medium of claim 6, wherein the plurality of resources comprise at least one of a bare metal server, a component of a bare metal server, a virtual machine, a container, or a container within a virtual machine.

8. The non-transitory computer-readable storage medium of claim 6, wherein the performance data comprises data for at least one of memory utilization, central processing unit utilization, hard drive utilization, disk utilization, or network utilization.

9. The non-transitory computer-readable storage medium of claim 6, wherein the one or more actions comprises moving at least a portion of a workload of the at least one of the plurality of resources to another resource in the plurality of resources.

10. The non-transitory computer-readable storage medium of claim 6, wherein to determine utilization of the plurality of resources, the processing device is to determine whether individual resources in the plurality of resources are being under-utilized or over-utilized.

11. A system comprising:
a memory; and
a processing device operatively coupled to the memory, to:
send a request to a cloud provider, the request for data for a metric of a particular resource provided by the cloud provider;
receive one or more data streams for the metric for the particular resource from the cloud provider, the one or more data streams comprising data points over a specified period of time, the data points having different time intervals between the data points;
create a uniform data stream from data in the one or more data streams, the uniform data stream comprising normalized data points having same time intervals between the normalized data points, wherein creating the uniform data stream comprises:
determining at least one data point is missing from the one or more data streams; and
interpolating data in the one or more data streams for the at least one missing data point;
create a data structure to store data for the uniform data stream, the data structure comprising a key-value database that uses time-stamps to represent the normalized data points in the uniform data stream as keys;
compare the uniform data stream for the metric to one or more other data streams for other metrics having the same time intervals between data points; and
determine, in view of comparing the uniform data stream stream to the one or more other data streams, utilization of the particular resource; and
cause, in view of the determined utilization of the particular resource, one or more actions to be performed on the particular resource as specified by a policy.

12. The system of claim 11, wherein the particular resource is a bare metal server, a component of a bare metal server, a virtual machine, a container, or a container within a virtual machine.

13. The system of claim 11, wherein the metric comprises at least one of memory utilization, central processing unit utilization, hard drive utilization, disk utilization, or network utilization.

14. The system of claim 11, wherein the one or more actions comprises moving at least a portion of a workload of the particular resource to another resource.

15. The system of claim 11, wherein to determine the utilization of the particular resource, the processing device is to determine whether the particular resource is being under-utilized or over-utilized.

* * * * *